Patented Mar. 20, 1923.

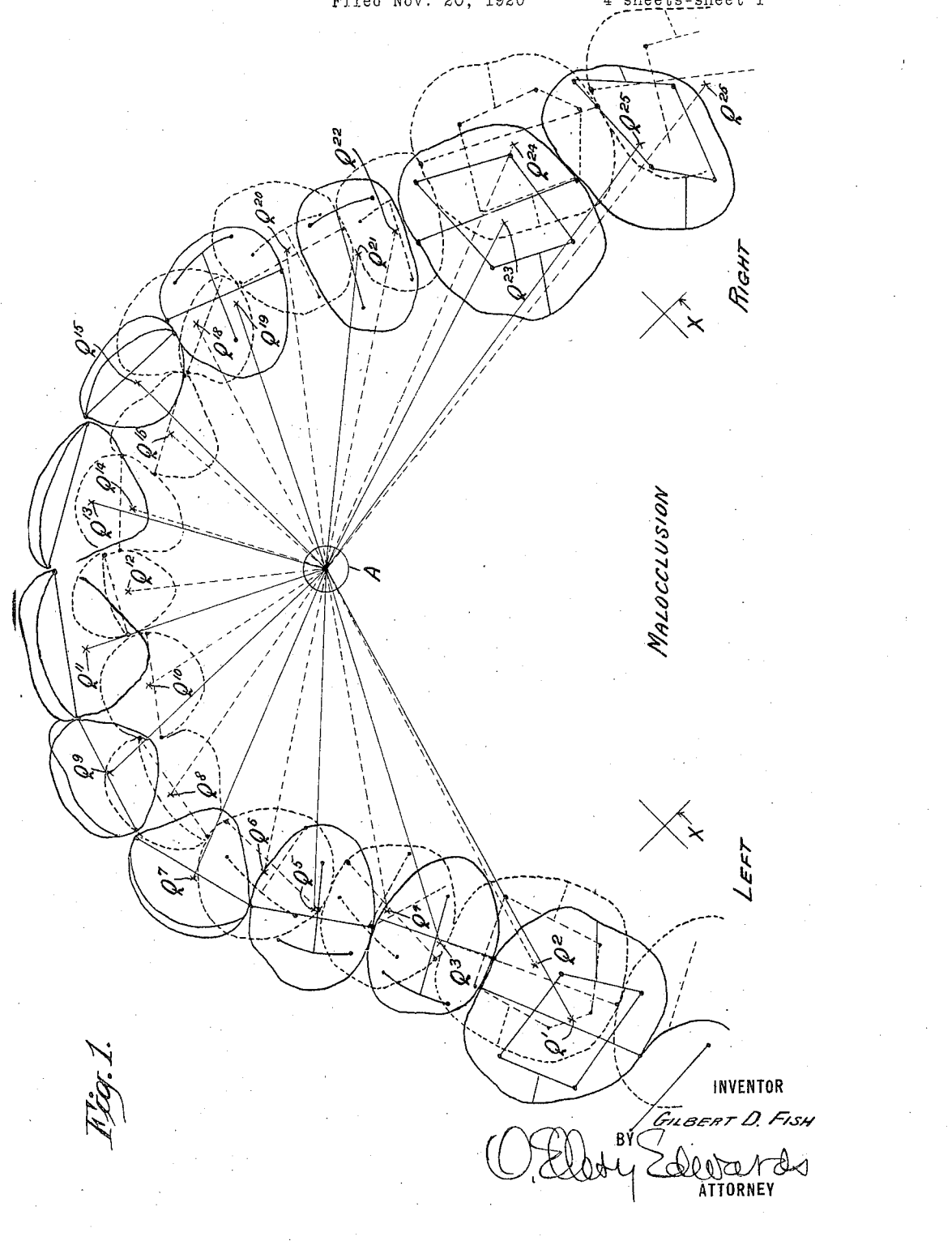

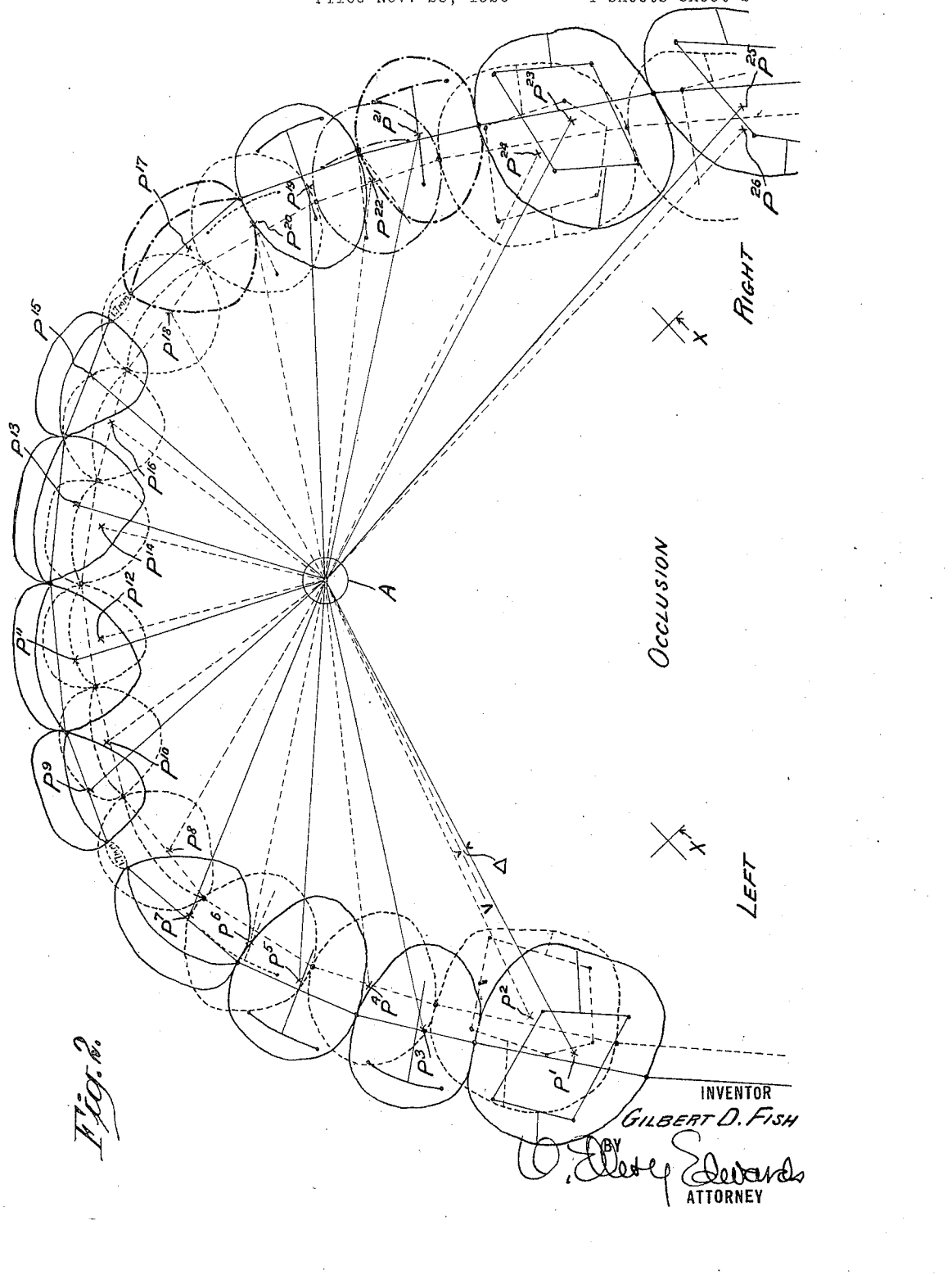

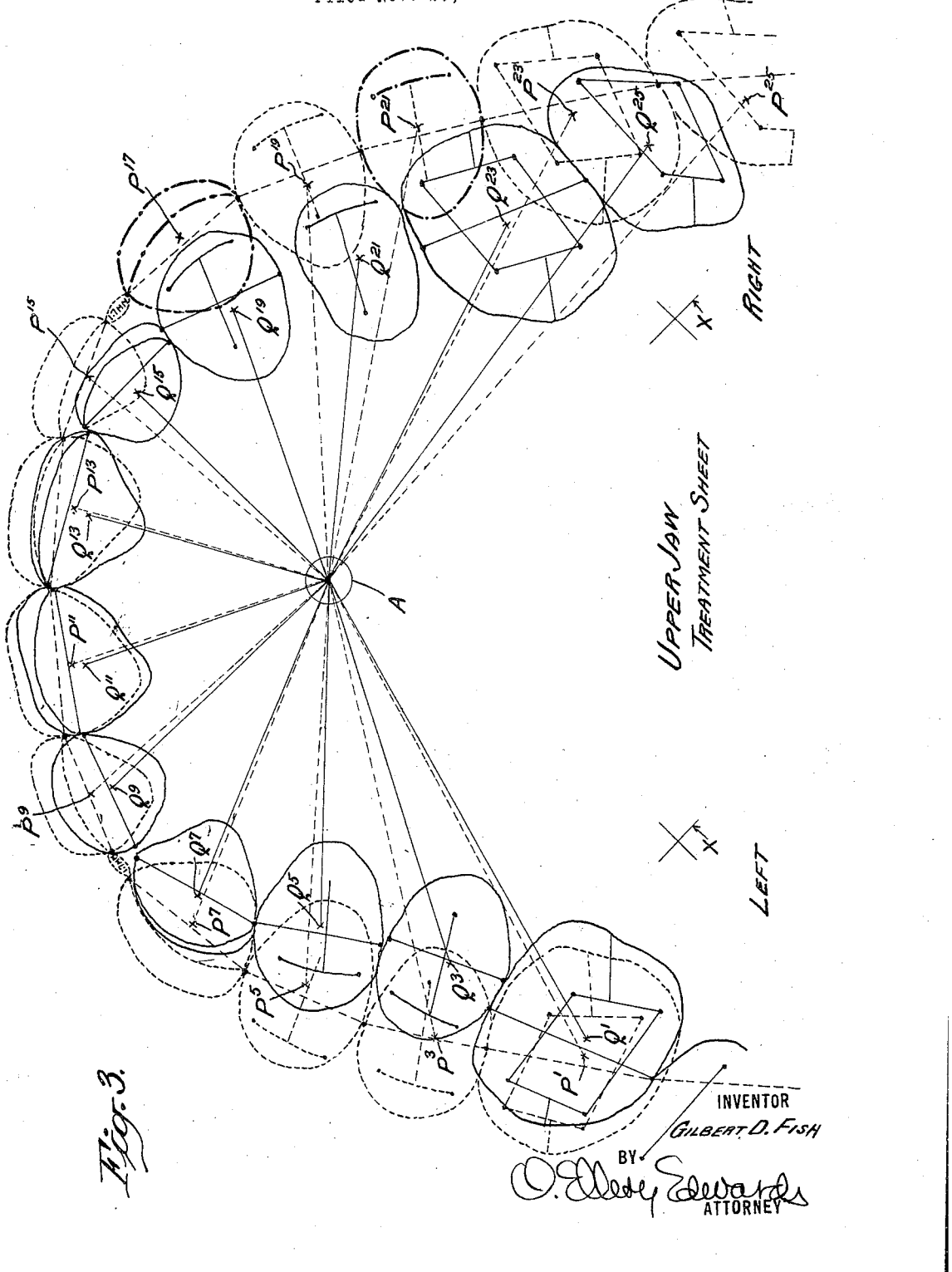

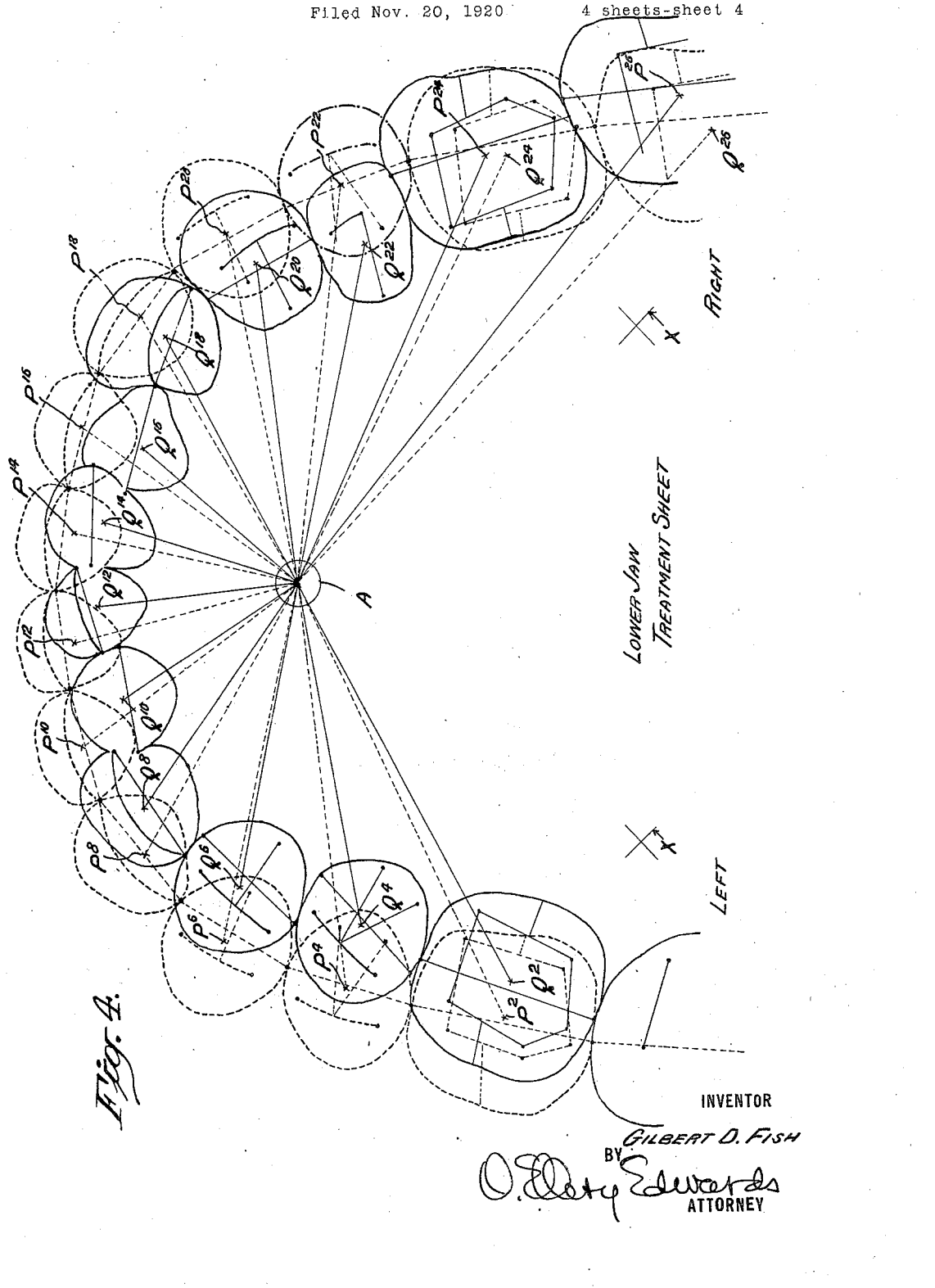

1,449,318

UNITED STATES PATENT OFFICE.

GILBERT D. FISH, OF WASHINGTON, DISTRICT OF COLUMBIA, ASSIGNOR TO FREDERICK L. STANTON, OF NEW YORK, N. Y.

DENTAL CHART AND METHOD OF MAKING THE SAME.

Application filed November 20, 1920. Serial No. 425,527.

*To all whom it may concern:*

Be it known that I, GILBERT D. FISH, a citizen of the United States, and a resident of the city of Washington, District of Columbia, have invented a new and useful Improvement in Dental Charts and Methods of Making the Same, of which the following is a specification.

In the patent of Dr. Frederick L. Stanton dated February 4th, 1919, No. 1,293,567, is shown a system of dental charts and method of making the same in which both malocclusal and occlusal charts are first made accurately and then superimposed, the skill and judgment of the operator determining the correctness of the placing. Obviously, the correctness of the work is a matter of opinion and is certain to involve error. The object of this invention is to eliminate all possibility of error by substituting mathematical correctness for opinion and skill.

This object is accomplished by my invention as will hereinafter more particularly appear.

For a more detailed description of my invention, reference is to be had to the accompanying drawings, in which Figures 1, 2, 3 and 4 show charts embodying my invention, Figure 1 showing the malocclusal, and Figure 2 the occlusal positions of the teeth of a patient, and Figures 3 and 4 show the treatment sheets of the upper and lower jaws, respectively.

Throughout the various views of the drawings, similar reference characters designate similar parts.

When this invention is utilized, a malocclusal chart of both jaws is made on a large scale in any suitable way, for example as set forth in my Patent No. 1,296,643 under date of March 11th, 1919, and an occlusal chart of both jaws is also made as directed in my Patent No. 1,246,408, dated November 13th, 1917, and all these charts are made on translucent paper or linen and are preferably ten times natural size, all as set forth in said patents.

Once these charts are made, they are superimposed and combined as follows, beginning with the malocclusal chart of the upper jaw.

First locate by inspection the centeroid of each tooth in the chart. In Figure 1 the upper and lower jaws are shown superimposed, the upper teeth being shown in full lines and the lower in dotted lines. Each centeroid of an upper tooth being designated by the letter Q and an odd number. These points will then be Q1, Q3, Q5, Q7, Q9, Q11, Q13, Q15, Q19, Q21, Q23, and Q25. It will be noted that Q17 is omitted. This is because the tooth to which this centeroid belongs has not emerged and is crowded by the adjacent teeth whose centeroids are Q15 and Q19. Locate and designate the centeroids of the teeth of the lower jaw in a similar manner using the characters Q2, Q4, etc.

Second, take a suitable axis, as the edge of a drawing board, and measure the perpendicular distance from each centeroid to this axis, add these distances to determine their sum, divide by the number of centeroids and so determine the average distance. Draw a convenient line near the center of the dental arch, parallel to the assumed axis and separated from it by this average distance. Then turn the chart through a convenient angle, say 60° and repeat the operation using the same axis as before. The lines so drawn will intersect. Again repeat the operation after turning the chart through another angle, say 60°, and if the three lines have a common intersection, the operation has been properly performed. If not it should be repeated de novo until this intersection occurs. This intersection is the check by which the accuracy of the work is proved.

Repeat this operation with the occlusal chart and so locate its centeroid. Let the centeroids of the upper jaw of the occlusal chart be similarly designated $P^1$, $P^3$, $P^5$, etc., and the centeroids of the lower jaw $P^2$, $P^4$, $P^6$, etc.

The points of intersection found, as above directed, are the centeroids of each chart. Reinforce each chart with a cloth center A pasted over this intersection and pass a needle through the center of the same and through the point of intersection. Now it is possible to superimpose one chart on another and pass a needle through all points of intersection so that these points will register when placed on a drawing board so that the charts may be turned on the needle according to directions given below.

Before the charts are so placed, each must be completed separately by joining the centeroid of the chart with the centeroid of each tooth and measuring the distance so found and then recorded, as well as the angle between each of such lines and the line of the first tooth. These angles are all measured by means of a suitable protractor. Let these angles with regard to the P groups be designated φ with the appropriate numeral to correspond with the tooth centroid to which the angle relates and similarly let θ with its appropriate numeral apply to the Q points. Let the difference between these angles, between occlusal and malocclusal centeroids for the same tooth, be represented by δ together with an appropriate numeral to correspond. As these angles are all small it is not necessary to go to the trouble of using the sine as the angle itself will give sufficiently accurate results. Then multiply, when measured clockwise, this angle δ by the distances of the corresponding Q and P points from the chart centeroid and call the product positive when the angle φ is greater than the angle θ and negative when the angle θ is greater than the angle φ. Add the positive products and then subtract the greater from the less and the difference will be divided by the sum of the products of the lengths of the lines joining the common centeroid of the jaw with the centeroid of each tooth in both its occlusal and malocclusal positions and the angle thus determined is the angle Δ which will be either positive or negative. Lay off the angle Δ on the occlusal map, clockwise from line A P I, if positive, counter-clockwise if negative. The line A V forming the angle Δ with A P I will be made to coincide with line A Q I when the two maps are superimposed one upon the other.

Finally, place the map of malocclusion upon the map of occlusion so that the two chart centeroids coincide and so that the two lines joining this point with the centeroids P1 Q1 will form the angle Δ. Assuming that the foregoing directions have been complied with and the angle Δ determined, it is recorded and fixed by making registering crosses X on each chart, as indicated. It is now possible to make the treatment charts shown in Figures 3 and 4 by tracing the malocclusional and occlusional positions of the teeth of the upper jaw as shown in Figure 4. These charts, when so made, indicate the minimum movements of the teeth when shifting malocclusal to occlusal positions.

Having thus described one embodiment of my invention, what I claim is:

1. A method of making dental charts which consists in making different charts showing the occlusal and malocclusal positions of the teeth of a patient and then determining in each chart the centeroid of all the teeth and thereafter superimposing the charts with the centeroids coinciding and placing the teeth of one chart with regard to the teeth of the other chart so that the minimum distance for shifting from malocclusal to occlusal positions will be indicated.

2. A dental chart showing teeth with the centeroid of each tooth marked thereon, a centeroid of all the teeth shown in the chart and lines connecting the centeroid of each tooth with the common centeroid.

3. A dental chart showing the malocclusal positions of the teeth of a patient and the centeroid of each tooth; a centeroid of all the teeth and lines joining the centeroid of each tooth with the common centeroid.

4. A dental chart showing the occlusal positions of the teeth of a patient and the centeroid of each tooth, a centeroid of all the teeth and lines joining the centeroid of each tooth with the common centeroid.

5. A dental chart showing the malocclusal positions of the teeth in the upper and lower jaws of a patient and the centeroid of each tooth, the common centeroid of all the teeth of the chart and lines joining the centeroid of each tooth with the common centeroid.

6. A dental chart showing the occlusal positions of the teeth in the upper and lower jaws of a patient and the centeroid of each tooth, the common centeroid of all the teeth of the chart and lines joining the centeroid of each tooth with the common centeroid.

7. A dental chart of a jaw of a patient showing the teeth in their occlusal and malocclusal positions and the centeroid of each tooth in both positions, a common centeroid of all the teeth in both positions and lines connecting the centeroid of each tooth with the common centeroid, the teeth in the occlusal and malocclusal positions being shown so that the chart will indicate the minimum shifting of teeth from malocclusal to occlusal positions.

8. A dental chart showing the teeth of a jaw of a patient and the common centeroid of such teeth, and a perforated transparent reinforce over such centeroid, the perforation coinciding with the centeroid, whereby the chart may be turned on an axis passing through the centeroid.

9. A dental chart having teeth with centeroids marked thereon and a centeroid of all the teeth shown in the chart.

10. A dental chart showing the malocclusal positions of the teeth of a patient, the centeroid of each tooth and centeroid of all the teeth.

11. A dental chart showing the occlusal positions of the teeth of a patient, the centeroid of each tooth and centeroid of all the teeth.

12. A dental chart showing the malocclusal positions of the teeth in the upper and lower jaws of a patient, the centeroid of each tooth and the common centeroid of all the teeth of the chart.

13. A dental chart showing the occlusal positions of the teeth in the upper and lower jaws of a patient, the centeroid of each tooth and the common centeroid of all the teeth of the chart.

14. A dental chart of a jaw of a patient showing the teeth in their occlusal and malocclusal positions and the centeroid of each tooth in both positions, a common centeroid of all the teeth in both positions, the teeth in the occlusal and malocclusal positions being shown so that the chart will indicate the minimum shifting of teeth from malocclusal to occlusal positions.

In witness whereof, I have hereunto set my hand this 27th day of October, 1920.

GILBERT D. FISH.